Figure 3:
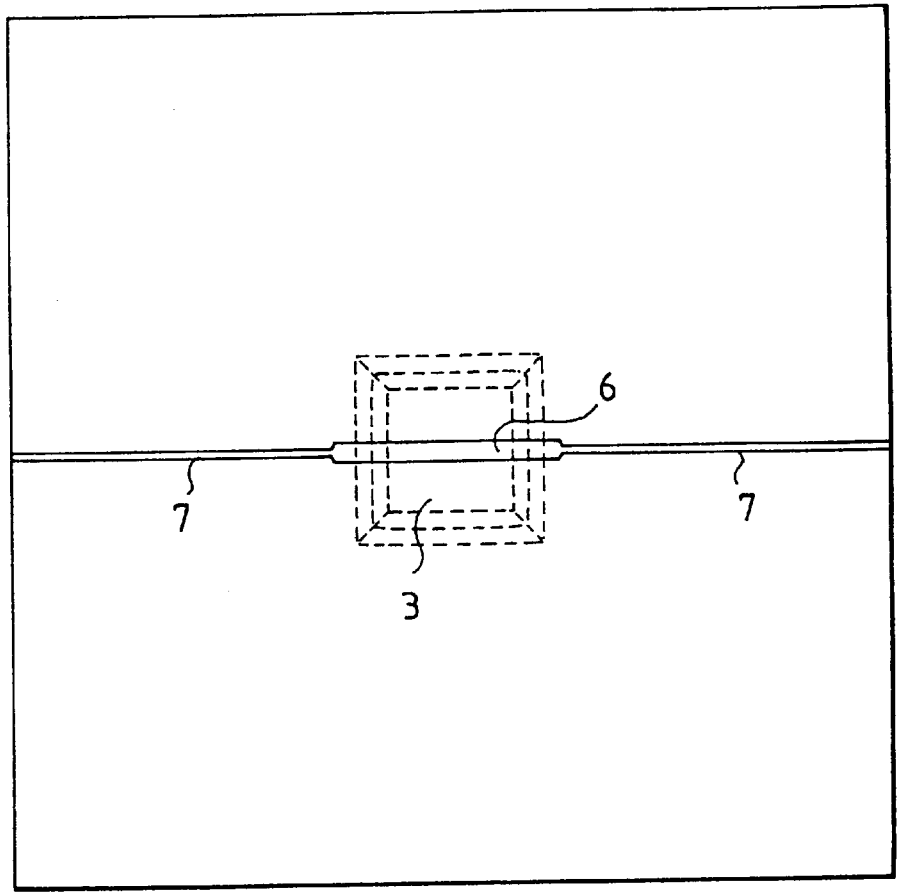

United States Patent [19]
Lehto et al.

[11] Patent Number: 5,934,307
[45] Date of Patent: Aug. 10, 1999

[54] OVERPRESSURE PROTECTOR

[75] Inventors: Ari Lehto, Helsinki; Eero Halonen, Pietarsaari; Markku Orpana, Espoo; Aarne Utriainen, Kokkola, all of Finland

[73] Assignee: Oy Beamex AB, Pietarsaari, Finland

[21] Appl. No.: 08/913,666
[22] PCT Filed: Mar. 11, 1996
[86] PCT No.: PCT/FI96/00148
  § 371 Date: Dec. 17, 1997
  § 102(e) Date: Dec. 17, 1997
[87] PCT Pub. No.: WO96/28677
  PCT Pub. Date: Sep. 19, 1996

[30] Foreign Application Priority Data

Mar. 14, 1995 [FI] Finland ................................... 951195

[51] Int. Cl.⁶ .................................................. F16K 17/40
[52] U.S. Cl. ..................................... 137/68.18; 137/68.23
[58] Field of Search ........................... 137/68.13, 68.18, 137/68.23

[56] References Cited

U.S. PATENT DOCUMENTS 4,275,406  6/1981  Moller et al. .
4,978,947  12/1990  Finnegan .
5,601,109  2/1997  Muddiman ..................... 137/68.18

FOREIGN PATENT DOCUMENTS 0519585  12/1992  European Pat. Off. .

Primary Examiner—John Fox
Attorney, Agent, or Firm—Merchant, Gould, Smith, Edell, Welter & Schmidt, P.A.

[57] ABSTRACT

The invention relates to an overpressure protector comprising a body portion (1) of single crystal silicon, a burst flow conduit (2) extending through the body portion (1), and a membrane (3) covering the burst flow conduit (2) and responding to a pressure difference. The membrane is a thin film (3), which is arranged to break when the pressure difference acting across it exceeds a predetermined value, and comprises a belt (6) whose electrical conductivity differs from that of the other material of the membrane. The belt is connected to means (9) for supplying electric current either for detecting breaking or the belt or for bursting the membrane (3) intentionally by means of heating effect of electric current.

5 Claims, 2 Drawing Sheets

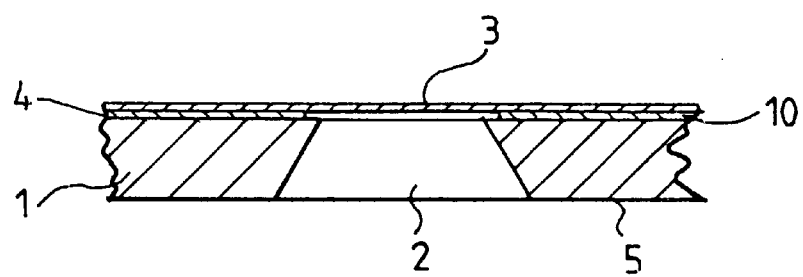
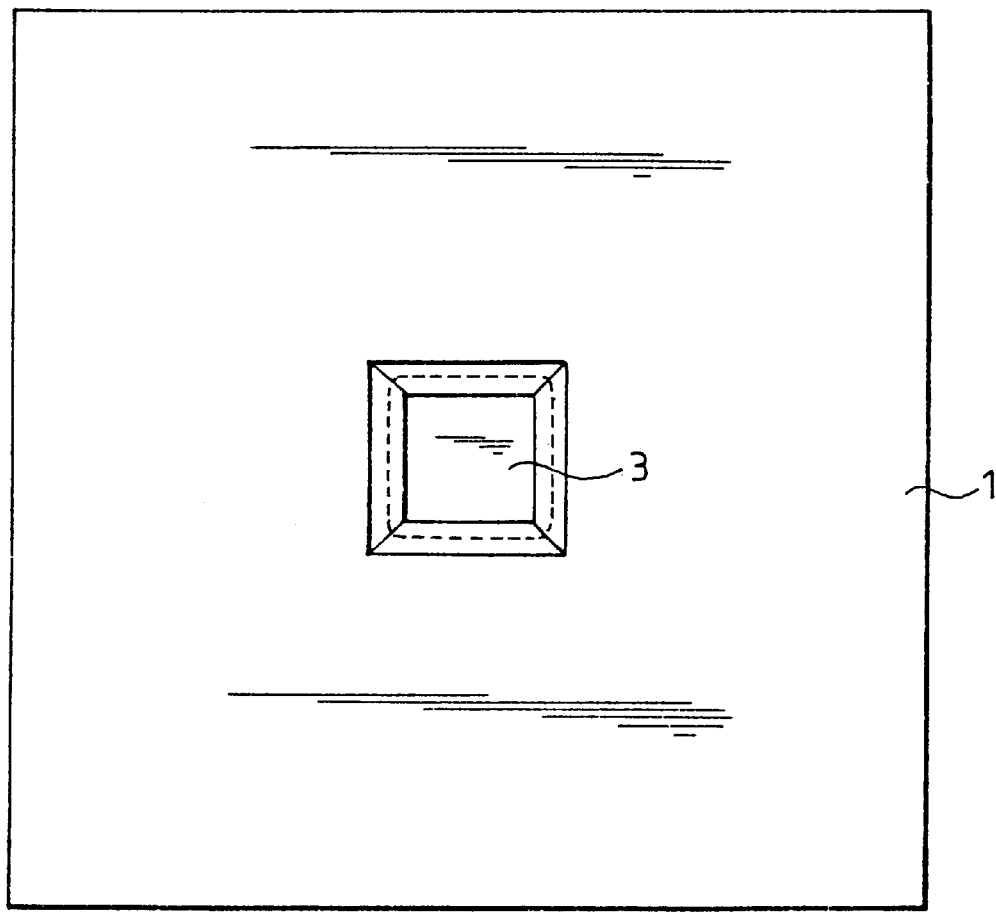

OVERPRESSURE PROTECTOR

The invention relates to an overpressure protector to be arranged between two separate spaces for preventing an excessive pressure difference between said spaces, comprising a body portion of single crystal silicon having a front surface and a back surface, a burst flow conduit processed by means of chemical etching and extending through the body portion, and a membrane supported by the front surface of the body portion, covering the burst flow conduit and responding to a pressure difference, said membrane being produced by means of growing prior to etching the burst flow conduit.

It is previously known to use overpressure protectors formed of metal films or films of other materials, as well as spring-loaded overpressure protectors for protecting probes of various kinds or the overall structure. Overpressure protection devices of this kind operate within the range from hundreds of millibars up to thousands of bars. The drawbacks of the conventional overpressure protectors are their costliness and large dimensions, especially when operating at small pressure differences. A spring-loaded overpressure protector placed in a measuring circuit of a control device, for instance, may also cause significant errors to measurement values, and thus even dangerous malfunctions when left leaking.

An overpressure protector for relatively low pressures is known from EP Patent Application 519 585, according to which crossing slits have been cut in a membrane formed of plastic film for dividing the membrane into four independent parts. On the membrane, a metallic conductor strip supporting the parts of the membrane and connected to an electrical indicator circuit is arranged, the portions of said strip supporting the different parts of the membrane cross at the crossing point of the slits in the membrane. A weakened portion at the crossing point of the conductor strip is used for predetermining the pressure at which the conductor strip will break. Breakage of the conductor strip, in turn, is detected by means of the electrical detector circuit.

An overpressure protector for protecting vessels and pipings is known from U.S. Pat. No. 5,279,321. In that protector, a thermoplastic material is used as the membrane responsive to pressure, conductor wires being embedded in said material, thus providing, in addition to reinforcement for the membrane, information on breakage of the membrane.

Membranes of thermoplastic materials, however, cannot be used as overpressure protectors at low pressures, as it is not possible to restrict their breakage or rupturing in a reliable manner to a narrow pressure range.

U.S. Pat. No. 4,275,406 and East German Patent 281 457, again, disclose piezoresistive pressure probes which have the features mentioned in the introduction, and in which a piezoresistor separated by an insulation layer has been grown on the surface of a bending silicon film. These pressure probes are intended for pressure measurement and are based on stretching of the membrane to which the piezoresistors are provided. These pressure probes are not suited for use as an overpressure protector because they have several structures, such as insulation layers that do not allow rupturing or breakage of the membrane structure at small pressure differences or within a predetermined narrow pressure range. In these pressure probes, the invention has been to provide the membrane with certain elastic properties instead of certain rupturing properties, as would be necessary when an overpressure protector is concerned.

The object of the present invention is to provide an overpressure protector which is also suited for use at small pressure differences, and which may be dimensioned to operate within a predetermined pressure range, yet enabling small manufacturing tolerances without the production costs rising too high. This is achieved with an overpressure protector in accordance with the invention, which is characterized in that the membrane is a thin-film, arranged to break when the pressure difference acting across the membrane exceeds a predetermined value, that the membrane comprises a belt whose electrical conductivity differs from that of the other material of the membrane, said belt being arranged to extend across the burst flow conduit, that the belt is provided with conductor strips and/or external conductors on different sides of the burst flow conduit, and that means for supplying electric current to the belt are connected to the conductor strips or conductors either for detecting a breakage of the membrane or for bursting the membrane intentionally by means of the heating effect of the electric current. In the manufacturing of the overpressure protector of the invention, processes known from manufacturing of solid state components and silicon micromechanics are thus employed, said processes enabling manufacturing of a large number of similar components on one and the same silicon wafer, whereby the unit costs thus remain relatively low. By means of this kind of a technique, it is possible to achieve the overpressure protector of the invention having a smaller size than the conventional overpressure protectors. Overpressure protectors of the invention can thus also easily be encased in conventional casings intended for microchips.

Preferably, the thin-film of the overpressure protector of the invention is a film of polycrystalline silicon.

Adapting the above-mentioned current supply means to the overpressure protector of the invention can easily be carried out especially if the overpressure protector is encased in a conventional casing for a microchip, or the like. Since most of the terminals of the casing are not necessary for electrical couplings of the circuit when a casing of this kind is used, an additional feature facilitating the installation and use of the protector may be connected to the overpressure protector of the invention. In accordance with this feature, part of the terminals are short-circuited with each other in accordance with a code indicating the operation range of the overpressure protector placed in said casing.

Figure 4:
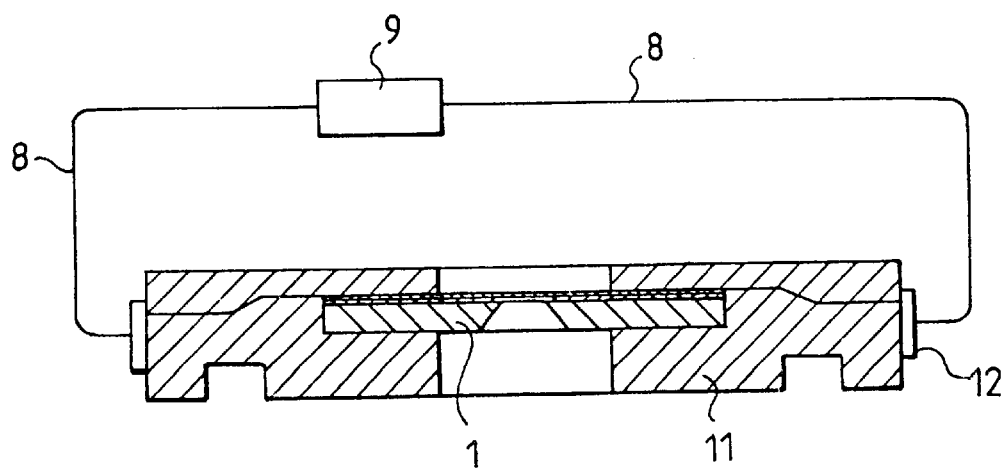

In the following, the overpressure protector of the invention and the manufacturing method associated therewith are described in more detail with reference to the attached drawing, in which FIG. 1 shows a cross-sectional view of the overpressure protector of the invention at the burst flow conduit, FIG. 2 shows a bottom view of the overpressure protector in accordance with FIG. 1, FIG. 3 shows a schematic top view of the overpressure protector of the invention in a case where it comprises means for controlling the operation of the overpressure protector, and FIG. 4 shows encasing of the overpressure protector of the invention, and connecting the casing to an external circuit.

FIGS. 1 and 2 show by way of an example an embodiment of the overpressure protector of the invention, comprising a body portion 1 made of single crystal silicon and having a bottom surface 5 and a top surface 4, as appears from FIG. 1. A burst flow conduit 2 leads through the body portion 1. On the side of the front surface 4 of the body portion 1, there is a thin film 3 covering the whole of the front surface, as well as the whole of the burst flow conduit 2. The thin-film is preferably made of polycrystalline silicon, but it can also be a thin-film made of some other material, such as molybden, tungsten, or some other metal, metal oxide or silicon nitride, or a diamond film.

The overpressure protector shown in FIGS. 1 and 2 can be achieved in the following way: First of all, e.g. a silicon oxide layer having a thickness of some 1 µm is grown on both surfaces of a polycrystalline silicon wafer to form a sacrificial layer 10. In FIG. 1 this silicon oxide layer can be seen as a layer on the front surface 4 of the body portion 1. Thereafter, a thin film 3 functioning as the actual thin-film of the overpressure protector is grown on said silicon oxide layer 10. Said thin-film 3 is advantageously made of polycrystalline silicon, and it may have a thickness of some 0.6 µm, for instance. For forming a burst flow conduit 2, e.g. a CVD oxide layer having a thickness of some 500 nm, for instance, is then grown for protecting the polycrystalline silicon layer on the front surface 4 of the body portion 1. Alternatively, both the front surface and the back surface of the body portion are covered with a thin silicon nitride layer having a thickness of some 100 nm, for instance. At the following stage, the possible protective nitride and the thin-film of polycrystalline silicon are removed from the back surface 5 of the wafer by means of plasma etching. Thereafter, an area of a desired size is formed on the silicon oxide layer on the back surface, which layer is now visible, by means of a photoresist and chemical etching for forming a burst flow channel. The area may be e.g. a square of 1500 µm×1500 µm, as shown in FIGS. 1 to 3. Areas having different shapes, such as round or oval areas are naturally also possible. Etching is then continued chemically e.g. with 25-% tetramethylammoniumhydroxide (TMAH) through the area formed this way so that a hole 2 is formed through the wafer 1 of single crystal silicon, having a side length of some 1000 µm on the front surface 4 of the silicon wafer. The hole in the front surface of the silicon wafer is still rectangular, yet having a smaller side length than the initial hole. This is based on the fact that in etching described above, etching proceeds in the shape of a cone in the manner described above. At the last stage, the silicon oxide layer 10 functioning as the sacrificial layer, and the protective layer on the thin-film 3 are etched off by means of a hydrogen fluoride solution. Thus, a structure as shown in FIGS. 1 to 3 is achieved, in which some of the sacrificial layer 10 has also been etched off between the front surface 4 and the thin-film 3. When a silicon wafer having a diameter of 100 mm, for instance, is used as the starting point, it is possible to process on one wafer of this kind several dozens of rectangular windows of polycrystalline silicon, as described above, having a thickness of e.g. 0.6 µm and the side length of 1000 µm.

After the process described above, it is possible to set the operating pressure of the protectors formed this way to some extent by means of different thermal treatments. A thermal treatment has an effect on the residual stresses of the thin-film, and thus the rupturing pressure.

Naturally, the operating pressure of the overpressure protector is mainly determined by the area of the burst flow conduit and the thickness of the thin-film covering the burst flow conduit. By means of these parameters, and the thermal treatment mentioned above, it is possible to dimension the overpressure protector of the invention to operate at a desired pressure difference within quite a wide pressure range, that is, it is possible to dimension the membrane to break when a desired pressure difference acts across the membrane.

FIG. 3 shows a more advanced embodiment of the overpressure protector of the invention, in which a belt 6 whose electrical conductivity differs from that of the material of the membrane 3 has been formed on the surface of the membrane by growing, or, perhaps more advantageously, by doping it to the membrane 3. This belt is arranged to extend over the burst flow circuit 2 and provided with conductor strips 7 starting from different sides of the burst flow channel for connecting it to an external circuit. When the overpressure protector of FIG. 3 is encased e.g. in a suitable casing 11 intended for microchips in accordance with FIG. 4, the conductor strips 7 are connected to the terminals 12 of the casing 11. To these terminals, in turn, means 9 may be connected by means of conductors 8 in accordance with FIG. 4, for monitoring breakage of the belt 6. These means 9 thus measure the resistance of the belt 6. Breakage of the membrane 3 results in a significant change in the resistance of the belt 6, since the belt will then be cut off, and its resistance will Increase practically infinite. Thus, with the aid of the means 9, it is possible to detect the operation of the overpressure protector, that is, breakage of the membrane 3.

From the point of view of the invention, perhaps the most advantageous way of implementing the belt 6 is doping it to the material of the membrane 3, as this will hardly change the thickness of the membrane, and the doping thus has just a little effect on the other operation of the overpressure protector, or e.g. on the pressure range within which it is dimensioned to operate. Instead, if the conductive belt is achieved by growing some conductive material on the surface of the membrane 6, this naturally has an effect on the breaking pressure of the thin-film, which must be taken into account when dimensioning the overpressure protector and determining the pressure range for it. In addition, a belt grown on the surface of the membrane tends to increase the variation of the operating point of overpressure protectors produced this way.

The structure in accordance with FIG. 3 also provides the interesting possibility that the means 9 used for monitoring the electrical conductivity of the belt 6 are also capable of generating a stronger current if necessary, in addition to the usual case in which they generate a slight electric current to pass through said belt 6 for monitoring its resistance. The stronger current can be utilized for triggering the overpressure protector intentionally by means of it. In the overpressure protectors implemented this way the belt 6 is arranged to have a moderate resistance. When current is now directed through the belt 6 having said resistance, the belt will heat up strongly, which thus results in breakage of the membrane, that is triggering of the overpressure protector.

As already mentioned above, FIG. 4 shows encasing of the overpressure protector of the invention in a casing 11 for microchips, said casing having a plurality of terminals 12. In practice, the casing may be any conventional casing having an appropriate size and intended for microchips. Since most of the terminals of the casing are not necessary for electrical couplings of the overpressure protector in connection with a casing of this kind, an additional feature facilitating the installation and use of the protector may be connected to the overpressure protector of the invention. In accordance with the feature mentioned above, part of the terminals are short-circuited with each other in accordance with a code indicating the operation range of the overpressure protector placed in the casing in question. Consequently, the apparatus as a part of which the overpressure protector is installed, will either be able to identify the overpressure protector, or at least detect whether the code of the installed overpressure protector is as expected, that is, whether its operation range is correct.

The overpressure protector of the invention has been described above by means of some exemplary embodiments only, and it is obvious that the exemplary dimensions described above may be altered even remarkably for achieving the desired pressure range, and similarly, some other material than the preferred alternative, polycrystalline silicon may be used as the material of the thin-film. Similarly, the sacrificial layers and protective layers used may be composed of other materials than those mentioned above, as is known from manufacturing of solid state components and silicon micromechanics.

We claim:

1. An overpressure protector to be arranged between two separate spaces for preventing an excessive pressure difference between said spaces, comprising a body portion (1) of single crystal silicon having a front surface (4) and a back surface (5), a burst flow conduit (2) processed by means of chemical etching and extending through the body portion (1), and a membrane (3) supported by the front surface (4) of the body portion, covering the burst flow conduit (2) and responding to a pressure difference, said membrane being produced by means of growing prior to etching the burst flow conduit, characterized in that the membrane is a thin-film (3), which is arranged to break when the pressure difference acting across it exceeds a predetermined value;

the membrane (3) comprises a belt (6) whose electrical conductivity differs from that of the other material of the membrane, said belt being arranged to extend across the burst flow conduit (2);

the belt (6) is provided with conductor strips (7) and/or external conductors (8) on different sides of the burst flow conduit; and that means for supplying electric current to the belt are connected to the conductor strips or conductors either for detecting a breakage of the membrane or for bursting the membrane intentionally by means of the heating effect of the electric current.

2. An overpressure protector as claimed in claim 1, characterized in that the thin-film is a membrane (3) of polycrystalline silicon.

3. An overpressure protector as claimed in claim 1, characterized in that the belt (6) has been produced on the membrane (3) by doping.

4. An overpressure protector as claimed in claim 1, characterized in that the belt (6) has been produced on the surface of the membrane (3) by growing.

5. An overpressure protector as claimed in claim 1, encased in a casing intended for microchips, or in some other similar casing comprising terminals (12), characterized in that part of the terminals (12) of the casing are short-circuited with each other in accordance with a code indicating the operation range of the overpressure protector installed in the casing.

* * * * *